(12) United States Patent
Sargent

(10) Patent No.: US 7,730,193 B2
(45) Date of Patent: Jun. 1, 2010

(54) AUTOMATED TIME ZONE BASED GROUPING

(75) Inventor: Alvan Sargent, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 287 days.

(21) Appl. No.: 11/696,053

(22) Filed: Apr. 3, 2007

(65) Prior Publication Data

US 2008/0250128 A1   Oct. 9, 2008

(51) Int. Cl.
*G06F 15/173* (2006.01)
(52) U.S. Cl. ............... 709/229; 709/227; 709/231; 709/224; 709/223; 709/203; 709/217; 709/237; 709/246; 709/228; 370/230; 370/235; 370/338; 370/328
(58) Field of Classification Search ............... 709/219, 709/203, 223–225, 230, 237, 246, 228, 227
See application file for complete search history.

(56) References Cited

U.S. PATENT DOCUMENTS

| | | | |
|---|---|---|---|
| 6,112,240 A | 8/2000 | Pogue | |
| 6,412,004 B1 | 6/2002 | Chen | |
| 6,684,250 B2 | 1/2004 | Anderson | |
| 6,871,213 B1 | 3/2005 | Graham | |
| 7,039,689 B2 | 5/2006 | Martija | |
| 7,100,204 B1 | 8/2006 | Myllymaki | |
| 2002/0174174 A1 | 11/2002 | Ramraj | |
| 2003/0115258 A1 | 6/2003 | Baumeister | |
| 2003/0220965 A1* | 11/2003 | Krissell et al. | ............... 709/203 |
| 2005/0091366 A1* | 4/2005 | Acharya | .................... 709/224 |
| 2006/0059238 A1 | 3/2006 | Slater | |
| 2006/0252438 A1 | 11/2006 | Ansamaa | |
| 2007/0239606 A1* | 10/2007 | Eisen | .......................... 705/51 |

* cited by examiner

*Primary Examiner*—Jude J Jean Gilles
(74) *Attorney, Agent, or Firm*—Vierra Magen Marcus & DeNiro LLP

(57) ABSTRACT

Time zone data is obtained from clients, such as web browsers, which interact with a server, and used to classify metrics of the clients such as response times. This classification technique does not require that a mapping of IP addresses to geographic location is available. Metrics from the clients are communicated from the server to a manager, which aggregates the metrics for each time zone. The manager can automatically associate geographic descriptors, such as names of cities, with the metrics in a report such as in a user interface display. If a partial mapping of IP address to location is available, the report can aggregate metrics which are grouped by IP address separately from metrics which are not grouped by IP address. The user interface display can be automatically populated with selectable nodes which allow a user to selectively view the metrics.

23 Claims, 15 Drawing Sheets

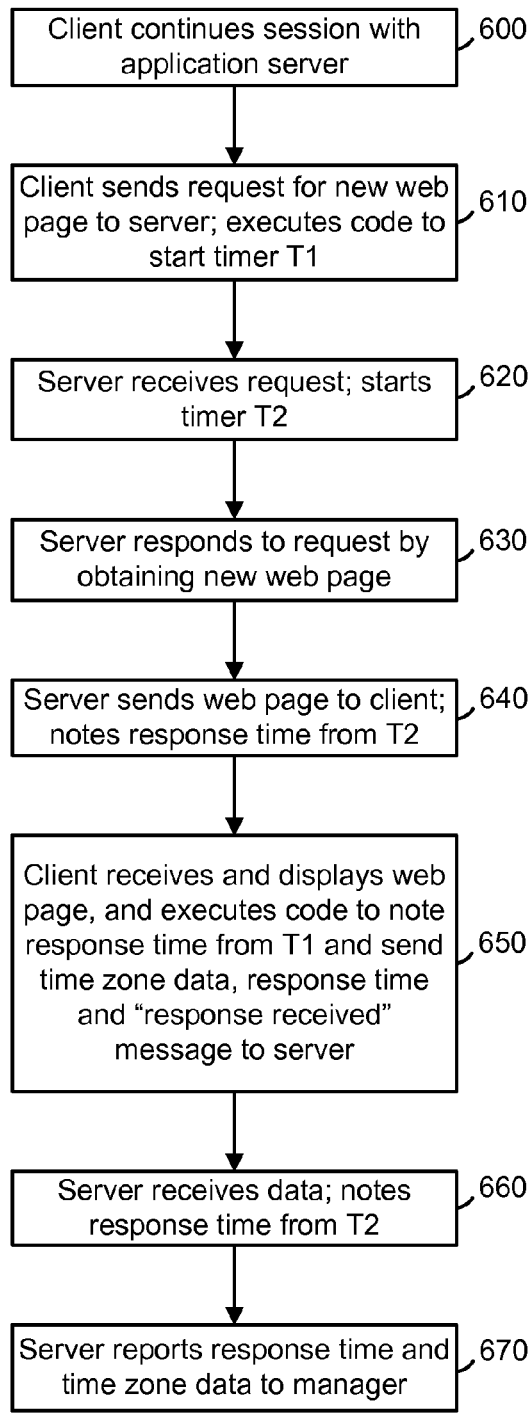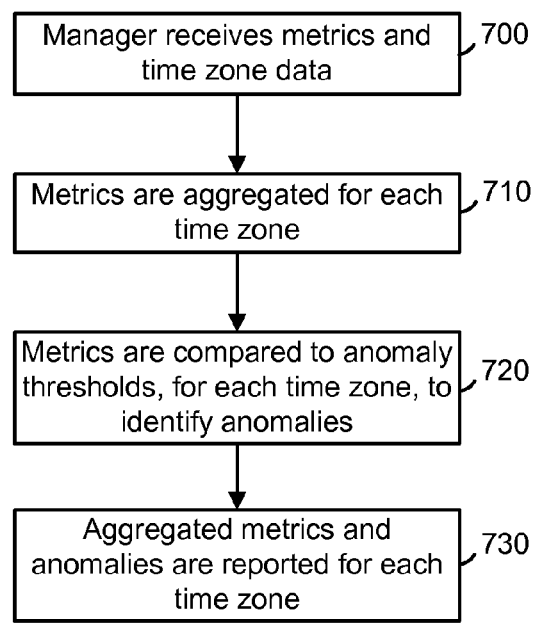

Fig. 10

Data reported to manager

| Timestamp | Client network address | Response time | Time zone |
|---|---|---|---|
| 10:05:03 | IP1 | 1.3 sec. | UTC-8 |
| 10:05:04 | IP5 | 3.5 sec. | UTC-7 |
| 10:05:45 | IP2 | 0.5 sec. | UTC-8 |
| 10:06:10 | IP9 | 1.5 sec. | UTC-6 |
| 10:06:36 | IP1 | 1.7 sec. | UTC-8 |
| 10:07:12 | IP3 | 2.6 sec. | UTC-8 |
| 10:07:24 | IP4 | 0.4 sec. | UTC-7 |
| 10:07:33 | IP8 | 0.3 sec. | UTC-6 |
| 10:07:58 | IP7 | 1.8 sec. | UTC-6 |
| 10:08:15 | IP6 | 2.0 sec. | UTC-7 |
| 10:08:20 | IP3 | 1.3 sec. | UTC-8 |

Fig. 11

Data grouped by time zone

| Timestamp | Client network address | Response time | Time zone |
|---|---|---|---|
| 10:05:03 | IP1 | 1.3 sec. | UTC-8 |
| 10:05:45 | IP2 | 0.5 sec. | UTC-8 |
| 10:06:36 | IP1 | 1.7 sec. | UTC-8 |
| 10:07:12 | IP3 | 2.6 sec. | UTC-8 |
| 10:08:20 | IP3 | 1.3 sec. | UTC-8 |
| 10:05:04 | IP5 | 3.5 sec. | UTC-7 |
| 10:07:24 | IP4 | 0.4 sec. | UTC-7 |
| 10:08:15 | IP6 | 2.0 sec. | UTC-7 |
| 10:06:10 | IP9 | 1.5 sec. | UTC-6 |
| 10:07:33 | IP8 | 0.3 sec. | UTC-6 |
| 10:07:58 | IP7 | 1.8 sec. | UTC-6 |

Fig. 12

Data aggregated by time zone

| Response time | Time zone |
|---|---|
| 1.5 sec. | UTC-8 |
| 2.0 sec. | UTC-7 |
| 3.6 sec. | UTC-6 |

Fig. 13

IP groups

| IP group (IPG) | Description | Time zone |
|---|---|---|
| IPG1 (includes IP1, IP2) | San Francisco office | UTC-8 |
| IPG2 (includes IP7, IP9) | Chicago office | UTC-6 |

Fig. 14

Data grouped by IP group

IPG1:

| Timestamp | Client network address | Response time | Time zone |
|---|---|---|---|
| 10:05:03 | IP1 | 1.3 sec. | UTC-8 |
| 10:05:45 | IP2 | 0.5 sec. | UTC-8 |
| 10:06:36 | IP1 | 1.7 sec. | UTC-8 |

IPG2:

| Timestamp | Client network address | Response time | Time zone |
|---|---|---|---|
| 10:06:10 | IP9 | 1.5 sec. | UTC-6 |
| 10:07:58 | IP7 | 1.8 sec. | UTC-6 |

Remaining data ungrouped by network address, grouped by time zone

| Timestamp | Client network address | Response time | Time zone |
|---|---|---|---|
| 10:07:12 | IP3 | 2.6 sec. | UTC-8 |
| 10:08:20 | IP3 | 1.3 sec. | UTC-8 |
| 10:05:04 | IP5 | 3.5 sec. | UTC-7 |
| 10:07:24 | IP4 | 0.4 sec. | UTC-7 |
| 10:08:15 | IP6 | 2.0 sec. | UTC-7 |
| 10:07:33 | IP8 | 0.3 sec. | UTC-6 |

Fig. 15

Data aggregated by IP group

IPG1:

| Response time | Time zone |
|---|---|
| 1.2 sec. | UTC-8 |

IPG2:

| Response time | Time zone |
|---|---|
| 1.7 sec. | UTC-6 |

Remaining data ungrouped by network address, aggregated by time zone

| Response time | Time zone |
|---|---|
| 2.0 sec. | UTC-8 |
| 2.0 sec. | UTC-7 |
| 0.3 sec. | UTC-6 |

AUTOMATED TIME ZONE BASED GROUPING

CROSS-REFERENCE TO RELATED APPLICATIONS

This application is related to co-pending, commonly assigned U.S. patent application Ser. No. 11/566,684, filed Dec. 4, 2006, titled "Response Time Benchmarking," (published as US2008/0133739), incorporated herein by reference.

BACKGROUND OF THE INVENTION

Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

In one approach, metrics such as response time can be obtained for different clients which interact with one or more servers. This can be achieved, e.g., by instrumenting components which execute at the server and/or monitoring requests which are received by the server and responses which are sent by the server. The metrics can be provided to a manager program which analyzes the data and can generate reports, alerts and so forth. For instance, consider a global corporate intranet which includes client machines in offices in different cities around the world. In order to analyze the metrics in a meaningful context, it is necessary obtain a mapping of a range of Internet Protocol (IP) addresses, such as private and/or public IP addresses, which are assigned to the clients, to the office location at which the clients are located. In this case, the metrics can be reported along with the IP address, and the manager can use the IP addresses to group the metrics which are associated with each office.

However, it can be difficult to obtain a mapping of IP addresses to office locations due to practical considerations. For example, the network management personnel of a corporation or other enterprise who are involved in configuring the IP addresses of the clients are typically different from the production application support personnel who are involved in monitoring network performance. The production application support personnel may not be sufficiently well-versed in network technologies to determine the IP address range which has been assigned to each office. Further, the network management personnel may not adequately disseminate the configuration information, including changes and updates. In such cases, classifying the metrics in a meaningful way can be problematic.

SUMMARY OF THE INVENTION

The present invention addresses the above and other issues by providing a system and method for grouping metrics.

In one embodiment, a computer-implemented method for grouping metrics includes receiving, at a server, requests from a plurality of clients, and responsive to the requests, providing responses to the clients with code which causes the clients to provide information identifying a respective time zone in which each client is located, where the clients are located in different time zones. The method further includes obtaining metrics associated with the requests and/or responses, and providing the metrics and the information identifying the respective time zones to a manager, in response to which the manager provides a report in which the metrics are grouped according to time zone. Further, the metrics are aggregated for at least one of the respective time zones. For example, response time metrics can be aggregated for clients in a given time zone.

In one possible approach, the clients include web browsers, the requested information includes web pages, and the responses comprise the web pages with the code embedded therein.

The method may further include providing network address data associated with the clients to the manager, where the metrics are grouped in the report according to the network address data and the information identifying the respective time zones.

In another embodiment, a computer-implemented method for grouping metrics includes receiving, at a manager, a) information identifying respective time zones in which clients associated with at least one server are located and b) metrics associated with the clients, and providing a report in which the metrics are grouped according to the respective time zones, where the metrics are aggregated for at least one of the respective time zones.

In one approach, the report presents the metrics aggregated over at least two of the respective time zones when a number of clients in the at least two of the respective time zones is determined to be below a threshold, e.g., below a statistically significant number of clients.

The method may further include using the information identifying the respective time zones to access data which associates geographic descriptors with different time zones and, responsive to the accessing, providing geographic descriptors for the respective time zones in the report. Further, the report can indicate whether the aggregated metrics for the at least one of the respective time zones is anomalous.

In one approach, the method includes accessing network address data associated with the clients, where the report presents the metrics according to the respective time zones and the network address data. The report can present aggregated metrics for at least a first group of the clients which are in a common time zone and which have been associated by virtue of their network address data, and aggregated metrics for other ones of the clients which are in the common time zone and which have not been associated by virtue of their network address data.

The method can further include determining whether network address data associated with the clients is available at the manager, and in response, presenting in the report metrics of clients whose network address data is available according to the network address data and the respective time zones, and metrics of clients whose network address data is unavailable according to the respective time zones.

In another embodiment, a computer-implemented method for grouping metrics includes accessing information at a manager identifying respective time zones in which clients are located and metrics associated with the clients. The method further includes providing a user interface display in which the metrics are grouped according to the respective time zones, where the user interface display provides selectable elements for the respective time zones in response to the information identifying the respective time zones, and each selectable element is selectable by a user to view the metrics associated with clients in the respective time zone associated with the selected element.

The method may further include accessing network address data associated with the clients, determining at least a first group of the clients which are associated by virtue of their network address data, and providing a first selectable child element of one of the selectable elements for the respective time zone in which the at least a first group of the clients is located, the selectable child element is selectable by a user to view metrics associated with the at least a first group of the clients.

Further, the user interface display may be automatically populated with the selectable elements in response to the information identifying respective time zones in which clients are located and the metrics associated with the clients.

The selectable elements can be automatically labeled with geographic descriptors which are associated with the respective time zones in response to the information identifying the respective time zones. Moreover, the labeled elements can be text-editable by a user. In one approach, the selectable elements are provides as nodes of a tree.

In other embodiments, at least one processor readable storage device having processor readable code embodied thereon may be provided for programming at least one processor to perform the above-mentioned methods.

BRIEF DESCRIPTION OF THE DRAWINGS

FIG. 6 depicts a process in which a client provides time zone data and response time metrics to a server and the server determines response time metrics associated with the client.

FIG. 7 depicts a process in which a manager processes metrics and time zone data.

FIG. 10 depicts data reported to a manager.

FIG. 11 depicts the data of FIG. 10, grouped by time zone.

FIG. 12 depicts the data of FIG. 1, aggregated by time zone.

FIG. 13 depicts network address groups.

FIG. 14 depicts the data of FIG. 10, grouped by network address group, and remaining data grouped by time zone.

FIG. 15 depicts the data of FIG. 14, aggregated by network address group and remaining data aggregated by time zone.

DETAILED DESCRIPTION

The present invention provides a system and method for grouping metrics.

Figure 1:
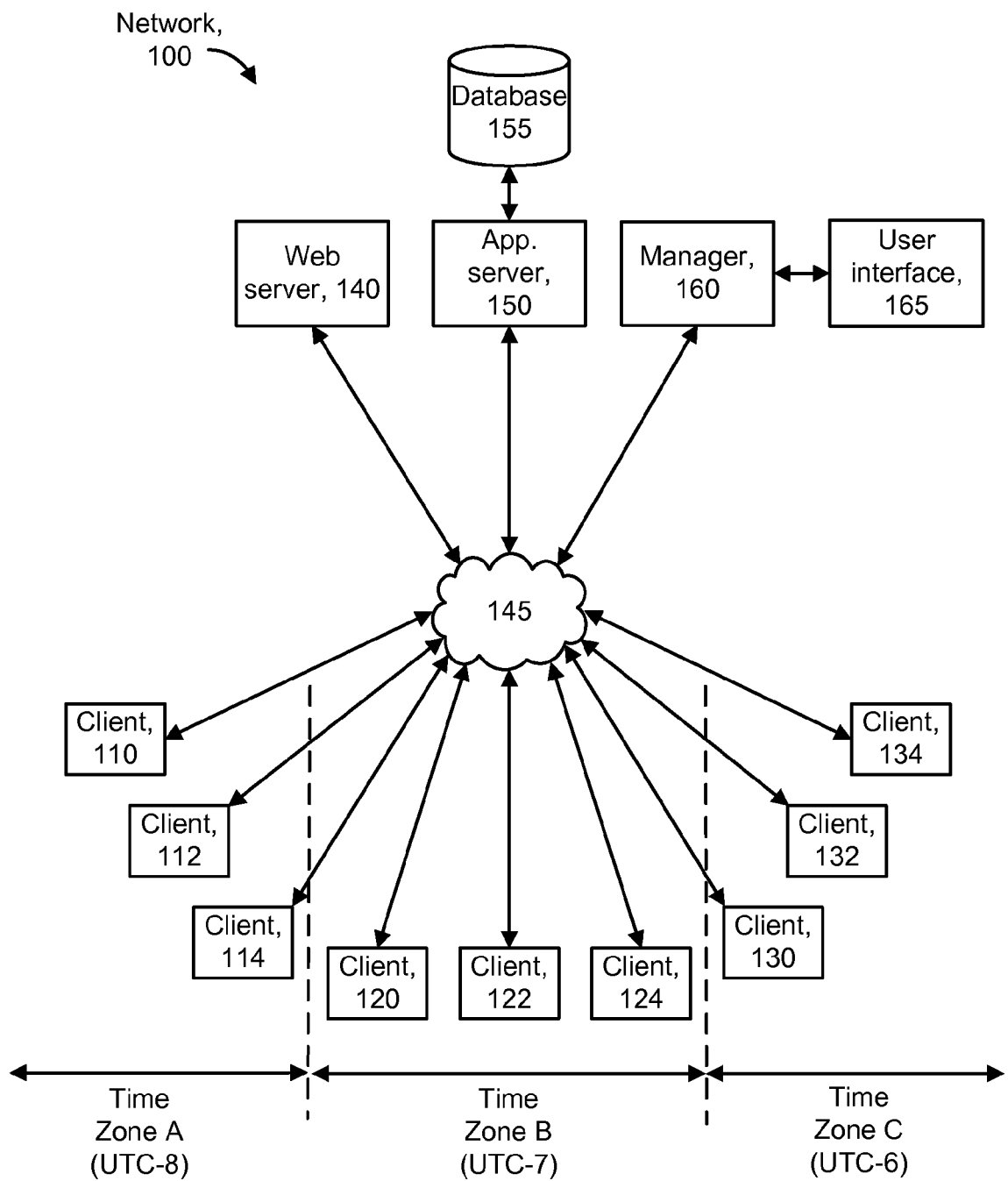
FIG. 1 depicts a system in which clients in different time zones communicate with a server.

FIG. 1 depicts a system in which clients in different time zones communicate with a server. Many network applications serve clients across the globe. For example, corporate intranet applications may allow client machines running browser software to access network resources and communicate with one another. For instance, salespersons at different corporate offices may enter and view sales data via a secure connection to a corporate owned database. The salespersons can also access other resources such as information from Internet web sites. The network 100 includes a number of example clients in different time zones, including clients 110, 112 and 114 in time zone A (e.g., UTC−8), clients 120, 122 and 124 in time zone B (e.g., UTC−7), and clients 130, 132 and 134 in time zone C (e.g., UTC−6). UTC denotes coordinated universal time, while UTC−8 denotes eight hours earlier, UTC−7 denotes seven hours earlier and so forth. The clients access an application server 150, typically via a web server 140 and a network cloud 145. Thus, the clients can establish a session with the application server 150, while the application server 150 may access other entities, such as a database 155 or other web services, to fulfill requests made by the clients.

In practice, relatively complex network topologies may be employed. In an enterprise application configuration, for example, typically clusters of application servers are set up at different geographic locations to serve a large population of users, while providing load balancing, backup protection and quick response times. Further, web applications can involve many different subsystems, such as web servers, application servers, identity management servers, database servers, messaging servers, and transaction processing servers. One or more hosts can be used to provide these subsystems and others.

It is desirable to monitor the performance of the application server 150 to ensure that response times, error rates and other performance metrics are acceptable. In one possible approach, the application server 150 includes performance monitoring software which monitors the application with which the clients interact. For example, the performance monitoring software can include an agent which essentially lives in the monitored application. In one approach, the monitored application is instrumented so that information regarding invoked components of the monitored application is provided to the agent. However, instrumenting is not required. Other performance monitoring approaches use code such as servlets, Enterprise Java Beans (EJBs) and JavaScript to obtain information of interest. In either case, the agent, in turn, can report the information to a manager program 160. The manager 160 can be co-located with the monitored application or provided on a separate server. Further, a number of application servers can report to one or more managers. The manager includes a user interface 165 which allows a network administrator or other user to obtain a report of the metrics. The user interface can be located remotely from, or co-located with, the manager 160.

To report metrics for clients in a useful context, the metrics can be reported with identifiers of clients such as network addresses. Typically, the clients in a location such as a corporate office are assigned IP addresses within a range of allocated addresses. Further, clients in respective different offices are assigned IP addresses in respective different ranges of IP addresses. The clients can include their IP addresses, or a portion thereof, in messages they send so that the recipient can identify them. Metrics associated with the clients, such as response time, can also be obtained and reported with the IP addresses. If the manager has information for mapping the IP addresses to the office location, the manager can report the metrics for each office location such as by aggregating the metrics for each office location. However, due to practical difficulties, as mentioned at the outset, obtaining the information for mapping the IP addresses can be time consuming and difficult.

In one aspect, metrics for clients can be reported in a useful context according to a time zone in which the clients are located. Reporting metrics by time zone by itself provides a useful context for understanding the metrics. For example, a report can indicate that response times in the western United States is acceptable, while response times in the eastern United States are high. Moreover, the reporting can be made more useful by knowledge of the office locations in each time zone. Further, the reporting of the metrics can make use of information for partially mapping IP addresses to geographic client locations. For instance, if the IP addresses of clients in one office location are known, the metrics can be associated with that office location, and metrics for other clients in the same time zone for which IP mapping is not available can be associated with the time zone. If the IP addresses of clients in a second office location become known, the metrics for those clients can be associated with that office location, and metrics for other clients in the same time zone for which IP mapping is not available can be associated with the time zone. The reporting of the metrics can thereby by modified over time as additional IP mapping data becomes available.

Figure 2:
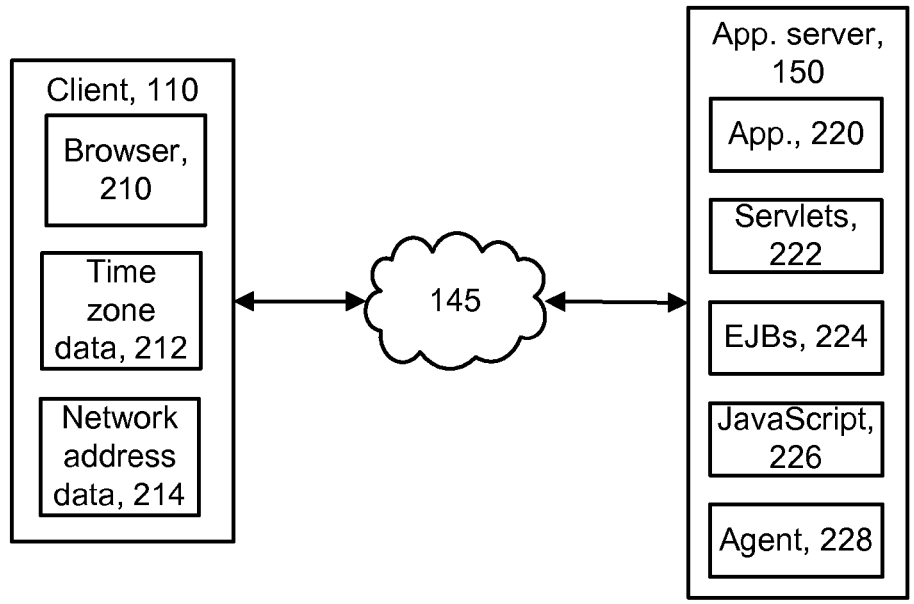
FIG. 2 depicts components at a client and an application server.

FIG. 2 depicts components at a client and an application server. An example client 110 includes a browser 210, time zone data 212 and network address data 214. The browser 210 allows the client 110 to access web sites on the Internet, an intranet, or other network. Regarding the time zone data 212, client operating systems typically include a facility for storing time zone data. For example, Microsoft Windows® includes a control panel which allows a user to set the local time zone. The time zone can be expressed in different ways. In one approach, the time zone is expressed relative to coordinated universal time (UTC), which corresponds to Greenwich Mean Time. For example, the western United States is in the time zone which is eight hours before UTC, or UTC−8. A client application such as the browser 210 can access the time zone data in various ways. For example, the JavaScript method "getTimezoneOffset( )" returns the difference in minutes between local time and UTC, which corresponds to Greenwich Mean Time (GMT). Additional code can convert the offset to units of hours.

The client 110 communicates with the application server 150, for instance, such as by sending requests to the application server and receiving responses from the application server. The request can be for a web page, for instance. The requests and responses may travel through a web server or other entities. In one possible approach, the application server 150 includes an application 220, servlets 222, EJBs 224, JavaScript 226 and an agent 228. When a request is received by the application 220, the application processes the request and generates a response, thereby forming a request-response pair. Processing the request may include performing actions by the application code within the application server 150 as well as accessing a database server or some other back-end server, e.g., by calling a servlet or EJB of the application.

The servlets 222 may embed JavaScript or other code into a response. JavaScript is an interpreted programming language which can be used to embed code into a web page, for instance. JavaScript can be placed into a HTML, ASP, or a similar type of file and run directly from the web page to perform various tasks. Other examples of interpreted programming languages include Jscript, Perl, PHP and Python. Other types of code can be used as well. Thus, a response such as a web page can be provided to the browser 210. The browser loads the web page and runs the embedded code to perform various tasks such as obtaining time zone data of the client and providing metrics, and subsequently provides the time zone data and metrics to the server or other entity.

The agent 228 gathers information regarding the application and reports it to the manager, for instance. For example, metrics, time zone data and network address data of the associated clients can be reported. The agent can process the data such as by aggregating the metrics, if desired, and/or report raw, unaggregated data to the manager. The agents can report the information in data logs to the manager periodically, for instance, in fifteen second intervals. The manager processes the data received from the agent to provide a report to an administrator via a user interface, for instance. The metrics can include information such as: a) connections/requests volume, which can denote the number of connections or requests in an interval, b) response time, which can denote the amount of time from when a request is initiated at the browser by a user click, to the time that the browser has fully loaded the response, c) download time, which can denote a subset of the overall response time that is spent on the network between the browser and the application front-end, d) size of GUID cache, which can denote the number of entries in a cache of globally unique identifiers (GUIDs) which are assigned to request-response pairs, e) browser response time, which can denote the time it takes for the browser to receive a web page response and load associated images, and f) HTML size, which can denote the average number of bytes transmitted in a response. The response times described above are examples only as other types of response time metrics can be obtained.

Figure 3:
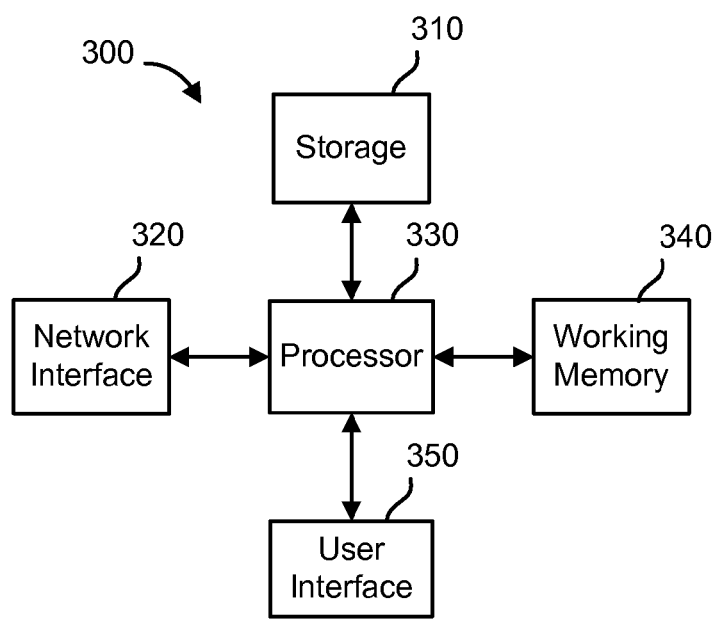
FIG. 3 depicts a computer system.

FIG. 3 depicts a computer system. The computer system 300 is a simplified representation of a system which might be used as a client, server and/or manager, such as discussed in connection with FIG. 1. The computer system 300 includes a storage device 310 such as a hard disk or portable media, a network interface 320 for communicating with other computer systems, a processor 330 for executing software instructions, a working memory 340 such as RAM for storing the software instructions after they are loaded from the storage device 310, for instance, and a user interface display 350. The storage device 310 may be considered to be a processor readable storage device having processor readable code embodied thereon for programming the processor 330 to perform methods for providing the functionality discussed herein. The user interface display 350 can provide information to a human operator based on the data received from one or more agents. The user interface display 350 can use any known display scheme, whether graphical, tabular or the like. In addition to an on-screen display, an output such as a hard copy such from printer can be provided.

Further, the functionality described herein may be implemented using one or more processor readable storage devices having processor readable code embodied thereon for programming one or more processors. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

Figure 4:
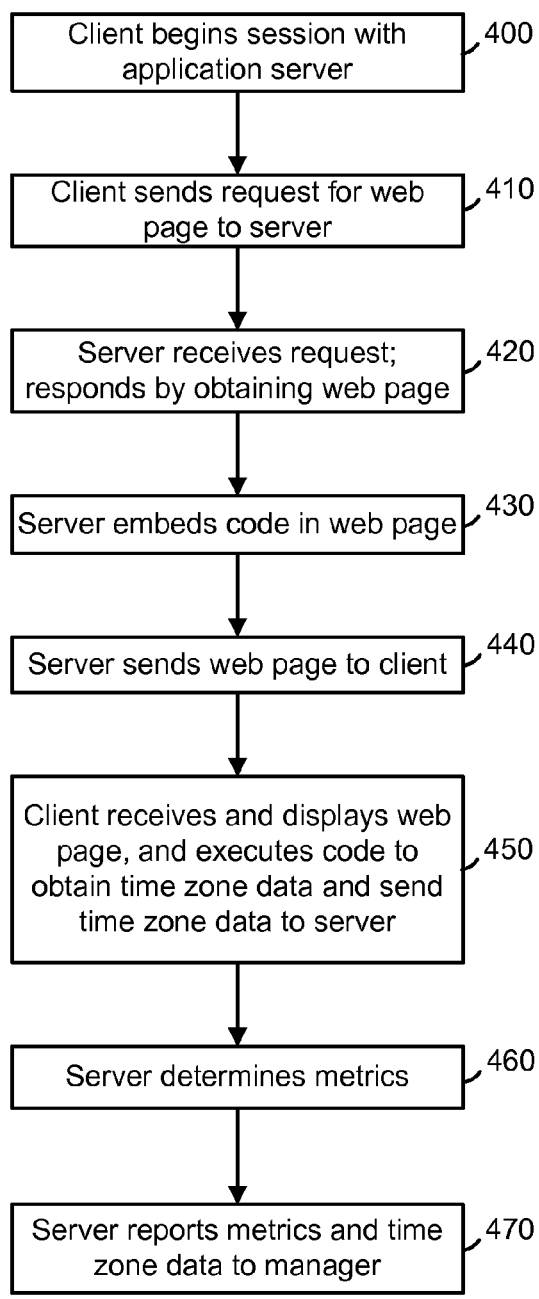
FIG. 4 depicts a process in which a client provides time zone data to a server and the server determines metrics associated with the client.

FIG. 4 depicts a process in which a client provides time zone data to a server and the server determines metrics associated with the client. Note that in this and other flowcharts provided herein, the steps performed need not necessarily be discrete steps and/or performed in the order indicated. In one approach, the server embeds code into a response which is provided to the client to cause the client to provide time zone data to the server. The server can also determine metrics associated with the client based on information provided by the client and/or the server itself. In particular, at step 400, the client begins a session with the application server. At step 410, the client sends a request for a web page to the server, such as via the onClick or onSubmit JavaScript events. Note that while an example is provided in connection with a web page, other implementations are possible. At step 420, the server receives the requests and responds by obtaining the web page. For example, the web page may be stored locally or may be accessed from a database. At step 430, the server embeds code in the web page. As mentioned, code such as JavaScript can be embedded in a web page, in one possible approach. The response can be passed through a servlet filter which tacks on statements at the end of an HTML page response, such as <include filename.js>, where "filename.js" is a JavaScript file, and <run filename> which causes the client browser to run the file after it has loaded the response. At step 440, the server sends the web page with the embedded code to the client.

At step 450, the client receives and displays the web page, e.g., by downloading static content such as images and text and other content of the web page from the server. The onUnload event is set at the client when the response is first received, indicating that the current web page is being exited, and the onLoad event occurs immediately after the received page is loaded. Additional information regarding techniques for embedding code in web pages and execution of the code by a web browser is provided in co-pending U.S. patent application Ser. No. 11/566,684, titled "Response Time Benchmarking," filed Dec. 4, 2006, incorporated herein by reference. Also, execution of the embedded code causes the client to communicate the time zone data and other information regarding metrics to the server or other entity. Providing code with the response to the client is advantageous in that the functionality provided by the code can be provided to any client without pre-configuring the client with the code and storing the code permanently at the client. Additionally, the code can be deleted after a session ends to avoid the potential for attacks by hackers. However, it is also possible to pre-configure the client with code for achieving the desired functionality, such as in the browser software itself.

Step 460 indicates that the server determines metrics associated with the client. For example, as explained further below, the server can set timers to determine the time it takes to respond to a request from a client, and the time it takes for the client to receive and load a page. The client can similarly set timers to determine the time it takes to receive a web page after it is requested. In one approach, the embedded code causes the client to gather metrics on its own and/or provide information to the server for use in gathering metrics. Metrics can include, e.g., connections/requests volume, response time, download time, size of GUID cache, browser response time and HTML size, among many other types of information which may be desired to monitor.

Step 470 indicates that the server reports the metrics and time zone data to the manager. In one approach, the server reports raw data for each request-response pair, for instance. The reporting can occur at regular intervals such as every fifteen seconds. The manager can subsequently process the data such as by aggregating it and obtaining statistics such as average, median, minimum, maximum, standard deviation and so forth. This approach also allows the details of individual request-response pairs to be accessed by an administrator in a drill down process. In another approach, the server aggregates the metrics and reports the aggregated metrics to the manager. This approach reduces the amount of information which is processed and stored by the manager. It is also possible for some processing to be performed at both the server and the manager. In practice, the server can provide metrics for a number of associated clients. Further a number of servers may communicate metrics to a central manager.

Figure 5:
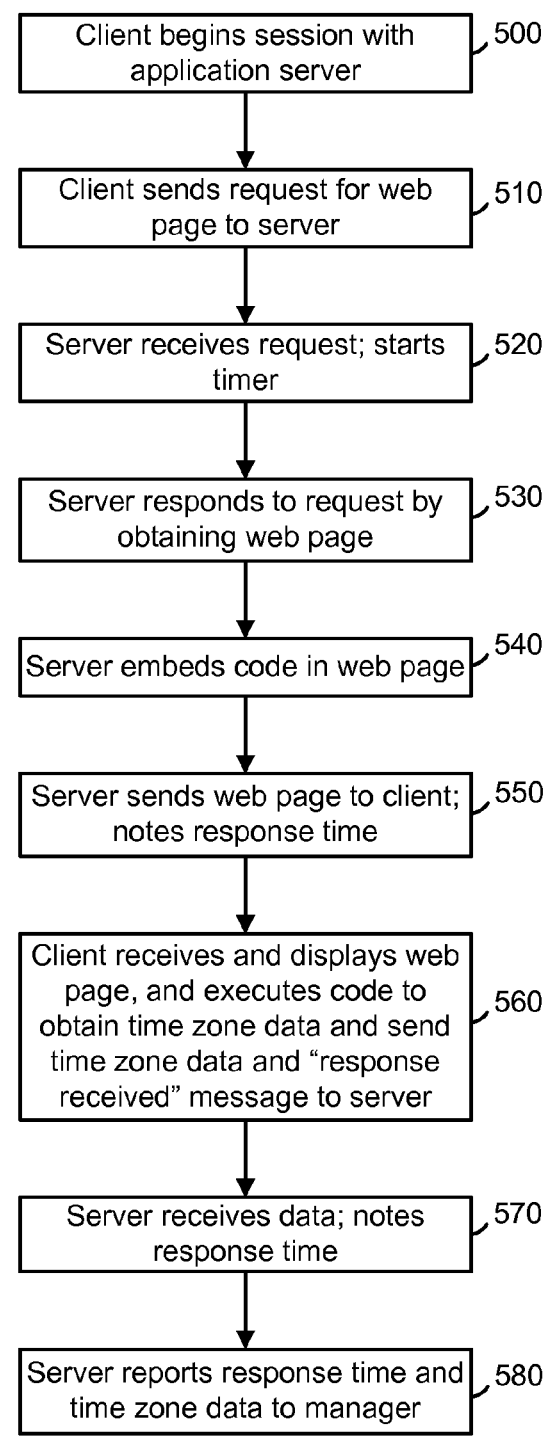
FIG. 5 depicts a process in which a client provides time zone data to a server and the server determines response time metrics associated with the client.

FIG. 5 depicts a process in which a client provides time zone data to a server and the server determines response time metrics associated with the client. At step 500, the client begins a session with the application server. At step 510, the client sends a request for a web page to the server. At step 520, the server receives the request and starts a timer. At step 530, the server responds to the request by obtaining the web page. At step 540, the server embeds code in the web page. At step 550, the server sends the web page with the embedded code to the client and notes the response time from the timer. At step 560, the client receives and displays the web page. Execution of the embedded code causes the client to communicate the time zone data and a "response received" message to the server or other entity. The time zone data can be provided as a data field in such a message. Note that the offset from UTC may be report as a positive or negative integer, in one approach, e.g., "−8" denotes UTC−8. Further, the code may access the time zone data, e.g., via the JavaScript method "getTimezoneOffset( )" prior to sending the "response received" message to the server.

In one approach, the "response received" message is a request for a 1×1 transparent pixel GIF. The server can subsequently provide the 1×1 transparent pixel to the client for display. For example, the "response received" message can be provided via a backdoor communication mechanism by using XMLHttpRequest (XHR). XHR is an API that can be used by JavaScript, JScript, VBScript and other web browser scripting languages to transfer and manipulate XML data to and from a web server using HTTP. Further, XHR prevents attacks by hackers by restricting calls by the client to the same domain from which the most recent response was received.

At step 570, the server receives the data from the client and notes a response time from the timer and, at step 580, the server reports the response time, other metrics, if available, and the time zone data to the manager.

FIG. 6 depicts a process in which a client provides time zone data and response time metrics to a server and the server determines response time metrics associated with the client. At step 600, the client continues an existing session with the application server so that the previously received embedded code is still present at the client. In this case, the server need not provide the embedded code in subsequent responses to the client. At step 610, the client sends a request for a new web page to the server, and executes the code to start a timer, T1. Note also that the time zone offset can be sent to the server with the request, in one option. At step 620, the server receives the request and starts its own timer, T2. At step 630, the server responds to the request by obtaining the web page. At step 640, the server sends the web page to the client and notes the response time from the timer T2. At step 650, the client receives and displays the web page. The client also executes the code to note a response time from T1 and sends its time zone data, response time and a "response received message" to the server. In this case, the response time noted by the client is the time from the initiation of a request until a time when the web page is received and displayed. Further, the response time noted by the server is the time from the receipt of the request from the client until the time the response is sent to the client.

At step 660, the server receives the data from the client and notes a response time from the timer T2, at step 670, the server reports the response time and other metrics, if available, and the time zone data to the manager. The response time here is the time up until the "response received message" is received. Note that network latency can be determined from the different response times.

FIG. 7 depicts a process in which a manager processes metrics and time zone data. At step 700, the manager receives the metrics and time zone data, e.g., from one more servers. It is also possible for the clients or another entity to communicate the metrics to the manager. Additional information such as network address data of the client may also be provided to the manager. Specific examples are discussed further below. At step 710, the manager aggregates the metrics for each time zone, in one possible approach. Aggregation can occur also for metrics which are known to be associated with a geographic location, such as by network address data. Aggregation can also occur over multiple time zones, fewer than all time zones, and over all time zones. For example, metrics can be aggregated over time zones which are associated with a given country or market. This approach can provide data which answers a question such as: "What is the average response time in Europe vs. the United States?"

The data can be aggregated and otherwise processed to derive statistics of interest. At step 720, the metrics are compared to anomaly thresholds to identify anomalies. For example, an anomaly threshold may indicate a maximum average response time. If the average response time which is obtained from the aggregated metrics for a given time zone exceeds the anomaly threshold, or is two or more standard deviations away from, and greater than, the average response time across all browser clients, an excessive response time anomaly for that time zone can be declared. The anomaly thresholds can be different for different time zones. Moreover, when metrics of individual request-response pairs are available, they can be compared to anomaly thresholds as well to identify and report anomalous request-response pairs. Further, an anomaly analysis can be performed for both user-generated HTTP request data and automatically generated request data. Anomalies can be identified periodically.

At step 730, the aggregated metrics, and the anomalies, if any, are reported for each time zone. The report can be provided via a user interface display, discussed further below, speakers, printers, network interfaces and so forth.

Note also that the aggregation of the metrics can be weighted based on different factors, e.g., different client priorities, time of day, day of week and so forth. Furthermore, the metrics can be aggregated according to URL groups. A URL group can be defined based on a URLs' part prefix, for instance.

Also, the time zone-based groups can be deleted once the manager has access to an office-to-IP address mapping, as mentioned. Further, time zone-based groups can be used to aggregate metrics gathered from both user-generated HTTP requests, as well as HTTP traffic generated automatically such as for benchmarking purposes.

Figure 8:
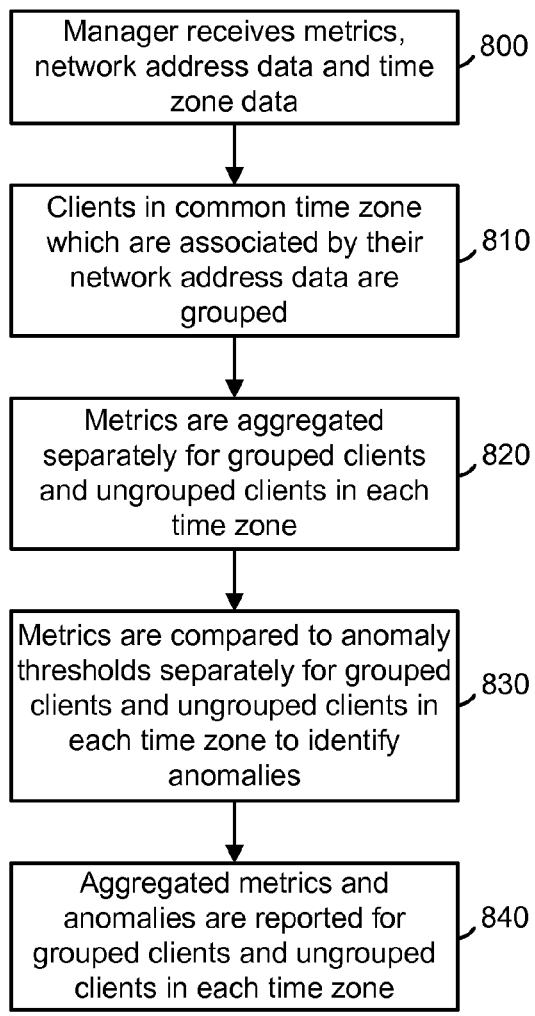
FIG. 8 depicts a process in which a manager processes metrics, network address data and time zone data.

FIG. 8 depicts a process in which a manager processes metrics, network address data and time zone data. At step 800, the manager receives metrics, network address data and time zone data. The network address data can be IP addresses/address portions of the clients with which the metrics are associated, for instance. At step 810, clients in a common time zone which are associated by their network address data are grouped, e.g., in a network address or IP address group. IP groups referred to as IPG1 and IPG2 are discussed in examples further below. This grouping can be achieved when a partial mapping of IP addresses to geographic location is available to the manager. For example, it may be know that a certain range of IP addresses are associated with a given office location of a corporation. Metrics associated with the range of IP addresses can therefore be grouped, while metrics which are associated with other IP addresses which are not in the known range cannot be grouped by IP addresses. These other metrics are therefore grouped by time zone. At step 820, metrics are aggregated separately for the grouped clients and the ungrouped clients in each time zone. At step 830, metrics are compared to anomaly thresholds separately for the grouped clients and the ungrouped clients in each time zone to identify anomalies. At step 840, the aggregated metrics, and the anomalies, if any, are reported for the grouped and ungrouped clients in each time zone.

Figure 9:
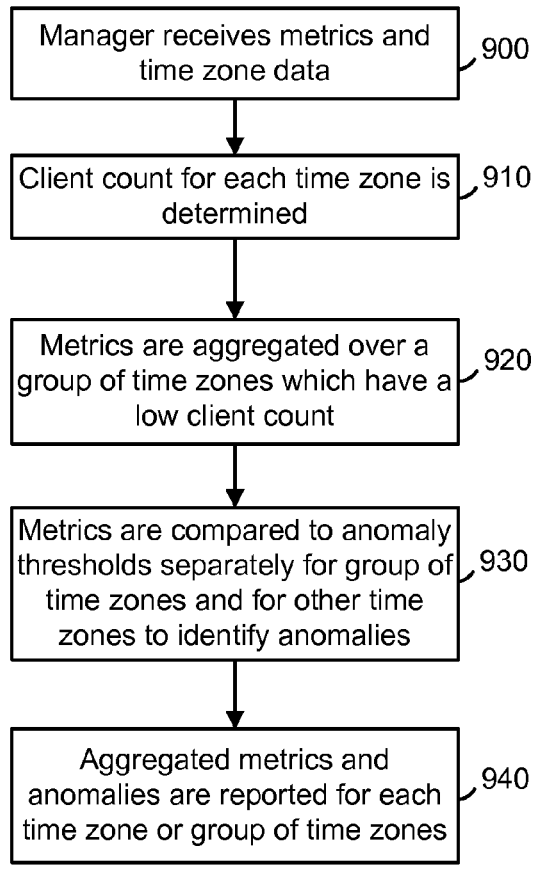
FIG. 9 depicts a process in which a manager processes metrics and time zone data for time zones with low client counts.

FIG. 9 depicts a process in which a manager processes metrics and time zone data for time zones with low client counts. At step 900, the manager receives metrics and time zone data. At step 910, the client count for each time zone is determined. For example, if the metrics are reported in a log which includes the IP address of the client, the time zone and the metrics, the manager can process the log to determine the client count from the number of unique IP addresses. In this manner, time zones which have a relatively low client count can be identified. For example, there may be relatively few clients in a given time zone based on the time of day. Or, a corporation may have relatively few clients in a new office. At step 920, the metrics are aggregated over a group of time zones which have a low client count. This may be desirable when the metrics from a given time zone are statistically unimportant, or when it is otherwise desirable to aggregate metrics in this way. At step 930, the metrics are compared to anomaly thresholds separately for the group of time zones and for the other time zones to identify anomalies. At step 940, the aggregated metrics, and the anomalies, if any, are reported for each time zone or group of time zones.

FIG. 10 depicts data reported to a manager. As mentioned, time zone data, metrics, network addresses and other data can be reported to the manager. The example data structure provided indicates that a timestamp indicating hours, minutes, and seconds is provided along with a client network address, a response time metric and time zone data. Moreover, the data is sorted according to the timestamp. For example, the first row of data indicates a time stamp of 10:05:03, a network address of IP1, a response time of 1.3 and a time zone of UTC−8. The network addresses include IP1 through IP9 and the time zone includes UTC−8 through UTC−6, in a simplified example. As mentioned, data can be reported to the manager at fixed intervals. The example provided extends between timestamps for 10:05:03 and 10:08:20 and may be reported over one or multiple intervals. For example, the entries at 10:05:03 and 10:05:04 fall within a fifteen second interval between 10:05:00 and 10:05:15 and therefore may be reported to the manager together.

FIG. 11 depicts the data of FIG. 10, grouped by time zone. Here, the data is sorted according to the time zone, so that first, second and third groups of entries are associated with UTC−8, UTC−7 and UTC−6, respectively. Further, the data is sorted according to the timestamp within each time zone group.

FIG. 12 depicts the data of FIG. 11, aggregated by time zone. Here, an average response time is provided for each time zone, e.g., 1.5 seconds for UTC−8, 2.0 seconds for UTC−7 and 3.6 seconds for UTC−6. Time values are rounded to the nearest tenth of a second. Other metrics and statistics can be provided as well, as discussed.

FIG. 13 depicts network address groups. The network address groups are IP groups in this example, and include first and second groups denoted by IPG1 and IPG2, respectively. IPG1 includes the network addresses IP1 and IP2, while IPG includes IP7 and IP9, for instance. Further, a geographic descriptor is associated with each network address group. For example, "San Francisco" is associated with IPG1 and "Chicago" is associated with IPG2. IPG1 and IPG2 are located in time zones UTC−9 and UTC−6, respectively. Additional information regarding the use of geographic descriptors is provided further below.

FIG. 14 depicts the data of FIG. 10, grouped by network address group, and remaining data grouped by time zone. With network address groups IPG1 and IPG2 defined as set forth in FIG. 13, the raw data received by the manager can be grouped as indicated. Specifically, the two entries for IP1 and the one entry for IP2 are grouped with IPG1, and the one entry for IP7 and the one entry for IP9 are grouped with IPG2. The remaining data can be ungrouped by network address but grouped by time zone as indicated. For example, the remaining entries for time zone UTC−8 include one entry each for IP3 and IP5, the remaining entries for time zone UTC−7 include two entries for IP3, and the remaining entry for time zone UTC−6 includes one entry for IP8.

FIG. 15 depicts the data of FIG. 14, aggregated by network address group and remaining data aggregated by time zone. For IPG1, the average response time is 1.2 seconds and for IPG2, the average response time is 1.7 seconds. For the remaining data which is ungrouped by network address, the average response time is 2.0 seconds for both UTC−8 and UTC−7, and 0.3 seconds for UTC−6.

Figure 16:
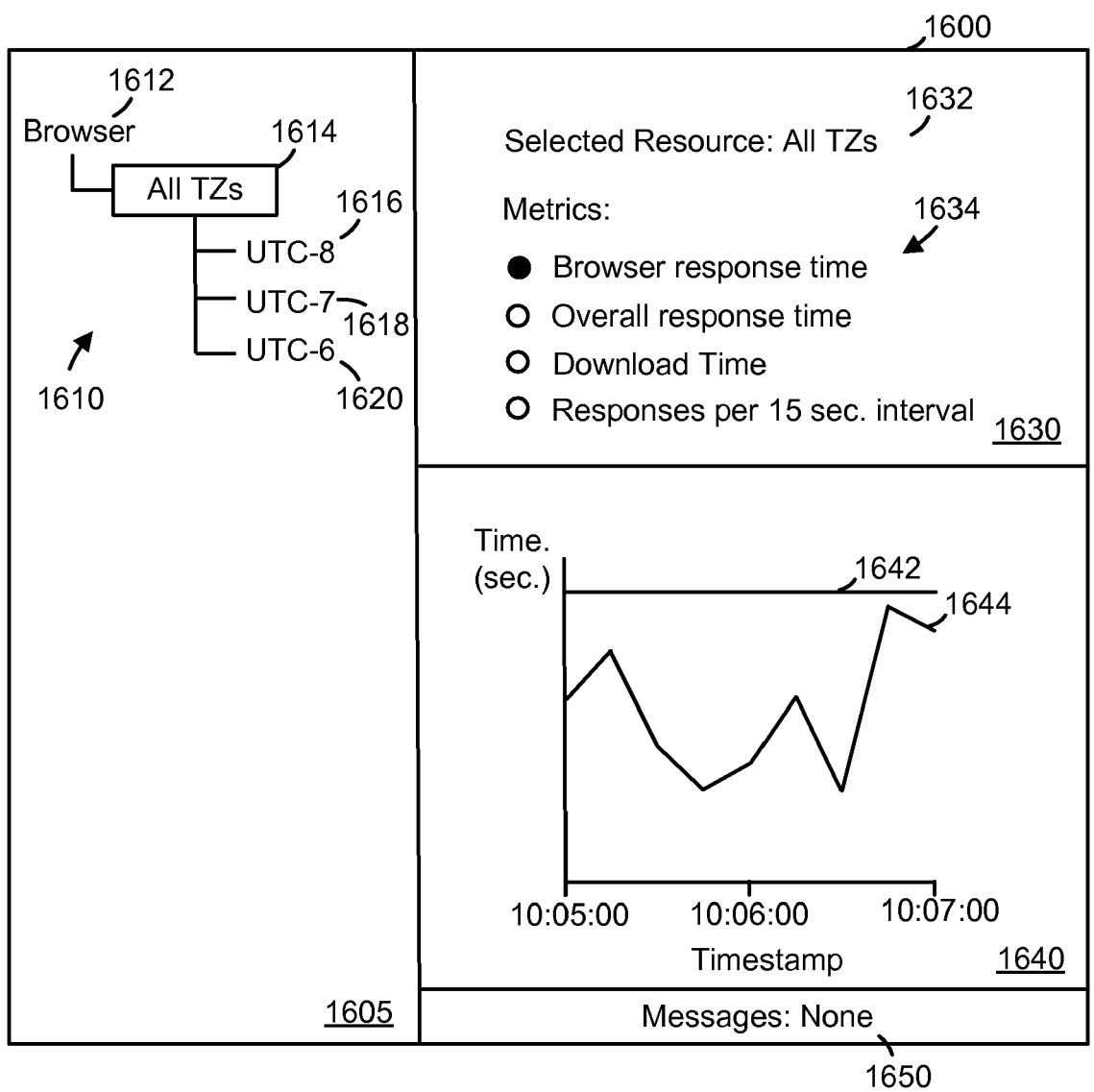
FIG. 16 depicts an example user interface display in which metrics from all time zones are displayed.

FIG. 16 depicts an example user interface display in which metrics from all time zones are displayed. The data obtained by the manager can be presented in any number of ways. The user interface displays provided herein are only one possible example. The user interface display 1600 includes a display region 1605 which includes a tree 1610 with nodes arranged in a hierarchy. A first level node 1612 is for "browser" data, a second level node 1614 which is a child node of "browser" is for "all TZs" (all time zones), and third level nodes 1616, 1618 and 1620, which are child nodes of "all TZs" are for time zones "UTC−8", "UTC−7" and "UTC−6," respectively. The nodes can be user selectable, and are examples of user selectable elements. For example, a user may employ a pointing device such as a mouse to select one or more of the nodes. Also, an initial default selection of one of the nodes can be provided. In response to the selected node or nodes, information is displayed in display regions 1630 and 1640. In particular, display region 1630 includes indicia 1632 which identifies the selected node in the display region 1605. Here, the indicia indicate a selected resource is "all TZs." Further, an indicia 1634 allows the user to select a particular metric for which data will be displayed in the display region 1640. In one possible approach, radio buttons allow the user to select from browser response time, overall response time, download time and number of responses per interval. Another approach could involve displaying one or more metrics automatically without a user selection.

With "browser response time" selected, the display region 1640 provides a graph of browser response time vs. timestamp. In particular, a curve 1644 denotes the average response time for successive reporting intervals, while a line 1642 denotes an anomaly threshold. In this case, the anomaly threshold has not been exceeded, so no anomaly messages are reported by indicia 1650. The graph can be adjusted by the user to show different ranges of time and so forth. Note that the curve 1600 denotes an average response time aggregated over all time zones, which includes UTC8, UTC−7 and UTC−6 in this example.

Figure 17:
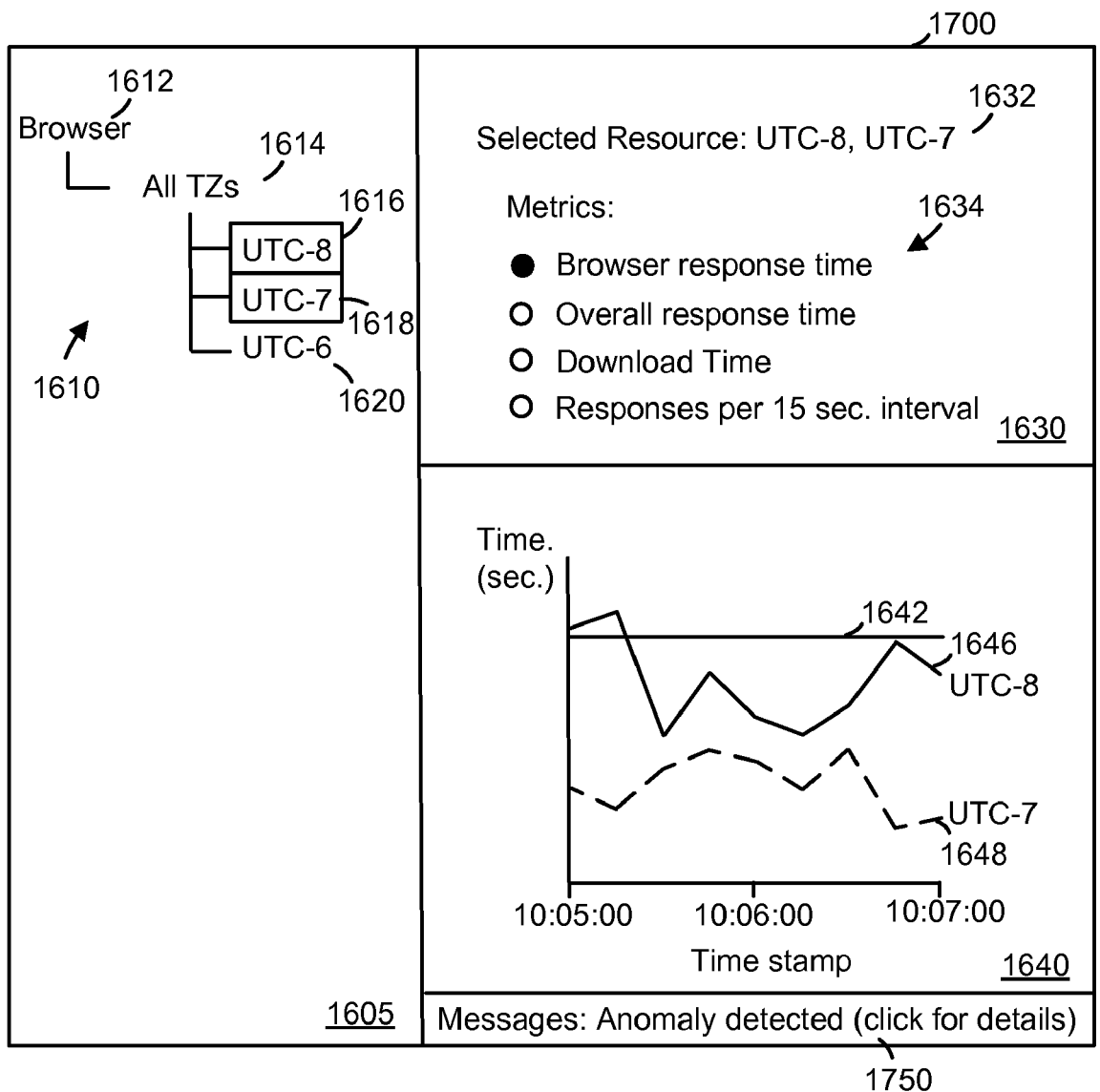
FIG. 17 depicts an example user interface display in which metrics from selected time zones are displayed.

FIG. 17 depicts an example user interface display in which metrics from selected time zones are displayed. If the user selects nodes 1616 and 1618, for example, from the tree 1610, the indicia 1632 is updated to indicate that time zones UTC−8 and UTC−7 have been selected. Further, the graph in the display region 1640 is updated to include a curve 1646 which represents response time aggregated over the time zone UTC−8 and a curve 1648 which represents response time aggregated over the time zone UTC−7. In this case, a portion of the curve 1646, at timestamps 10:05:00 and 10:05:15, exceeds the line 1642, indicating an anomaly. The indicia 1750 indicates that an anomaly has been detected. Further, a link to additional information regarding the anomaly can be provided. For example, if the raw data is available, the metrics and other information for a specific client can be identified and displayed to the user, in a drill down process.

Figure 18A:
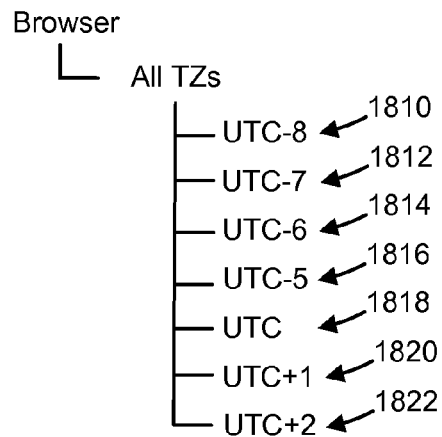
FIG. 18a depicts an example user interface display in which selectable nodes of a tree are labeled using UTC offset identifiers.

FIG. 18*a* depicts an example user interface display in which selectable nodes of a tree are labeled using UTC offset identifiers. A tree in a user interface display can provide information in different ways. In one approach, the UTC offset identifiers are used. As mentioned, the identifiers can be provided as positive or negative integer offsets from UTC. In one approach, the manager receives the value "−8" in a data field for time zone offset and adds the text "UTC" in front of the value to provide the label "UTC−8," for instance, for the corresponding node. In another approach, the labels themselves are included in the data reported to the manager. Here, the tree includes nodes 1810, 1812, 1814, 1816, 1818, 1820 and 1822 for UTC−8, UTC−7, UTC−6, UTC−5, UTC, UTC+1 and UTC+2.

Figure 18B:
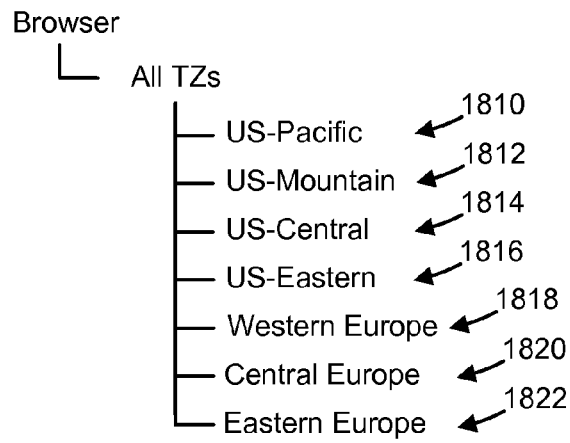
FIG. 18b depicts an example user interface display in which selectable nodes of a tree are labeled using generic geographic descriptors.

FIG. 18*b* depicts an example user interface display in which selectable nodes of a tree are labeled using generic geographic descriptors. To facilitate better understanding of the time zones, geographic descriptors can be automatically provided for the nodes which represent the different time zones. In one approach, the manager receives the value "−8" in a data field for time zone offset and provides the label "US-Pacific" for the corresponding node based on a local database which maps time offset to geographic descriptor. Such a database can be configured by the administrator or obtained from an on-line source, for example. The label is a geographic descriptor since it describes the geographic location of the client associated with the metrics which are provided when the node is selected. Similarly, the time zone offsets UTC−7, UTC−6, UTC−5, UTC, UTC+1 and UTC+2 can be associated with geographic descriptors "US-Mountain," "US-Central," "US-Eastern," "Western Europe," "Central Europe," and "Eastern Europe," respectively. In another approach, the geographic descriptors themselves are included in the data reported to the manager. In any case, the tree can be populated automatically with the geographic descriptors.

Figure 18C:
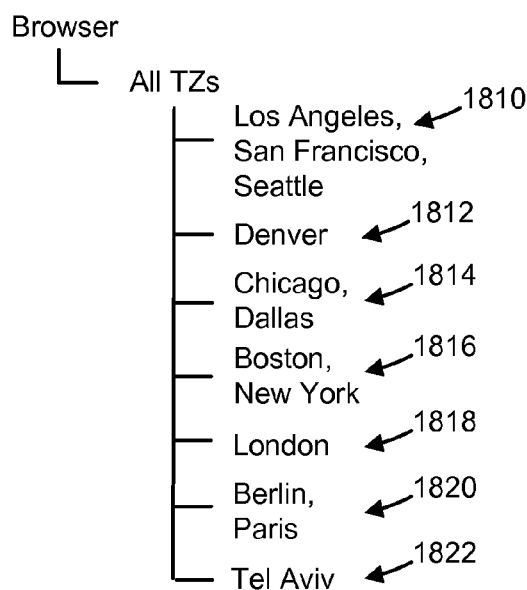
FIG. 18c depicts an example user interface display in which selectable nodes of a tree are labeled using custom geographic descriptors.

FIG. 18*c* depicts an example user interface display in which selectable nodes of a tree are labeled using custom geographic descriptors. Here, the administrator can use knowledge regarding the geographic location of clients in different time zones to provide geographically descriptive labels for the nodes, even without knowledge of IP address to location mappings. For example, a corporation may have offices in three cities in the US-Pacific time zone, namely Los Angeles, San Francisco and Seattle. In this case, the node 1810 can provide the corresponding geographic descriptor. In one approach, the manager receives the value "−8" in a data field for time zone offset and provides the label "Los Angeles, San Francisco and Seattle" for the corresponding node based on a local database which maps time offset to geographic descriptor. Such a database can be configured by the administrator or obtained from an on-line source, for example. Similarly, node 1812 can have the geographic descriptor "Denver" when that is the sole office in UTC−7, node 1814 can have the geographic descriptors "Chicago, Dallas" when those are the two offices in UTC−6, node 1816 can have the geographic descriptors "Boston, New York" when those are the two offices in UTC−5, node 1818 can have the geographic descriptor "London" when that is the sole office in UTC, node 1820 can have the geographic descriptors "Berlin, Paris" when those are the two offices in UTC+1, and node 1822 can have the geographic descriptor "Tel Aviv" when that is the sole office in UTC+2. As before, the tree can be populated automatically with the geographic descriptors based on the time offset data and the mapping from time offset to geographic descriptor. Further, in this and the other interface displays, labels for the nodes can also be text editable so that the administrator can manually type in names of cities, for instance, which correspond to the nodes. The text editing can be provided via a GUI implemented with an appropriate type view.

In another approach, geographic descriptors for major cities, states and/or countries can be provided initially for each time zone. The descriptors could then be edited by the user so that only cities, states and/or countries with known office locations are shown. The initially provided geographic descriptors provide a hint as to which cities, states and/or countries are associated with the known office locations of a given corporation, for instance. The user then employs his or her own knowledge to edit the initially provided geographic descriptors and/or provide new geographic descriptors.

In one possible implementation, a "Description" property of time zone groups, data type of string, can be used to list all the geographic regions (major cities, states, and/or countries) contained in a time zone. Geographies with major business centers can be listed first in this string. This description field could be edited by the user for clarity, so that only cities with known office locations are shown. Editing can be done via a GUI implemented with an appropriate type view.

Another possible property of time zone groups is "visible," which has a data type of Boolean. A value of True means that a time zone group appears in the tree, while a value of false means it does not. Visible would initially be set to false for each group. As the manager sees data from browser clients with a particular time zone offset, it sets the corresponding group's Visible property to true, and that group appears in the tree.

Figure 18D:
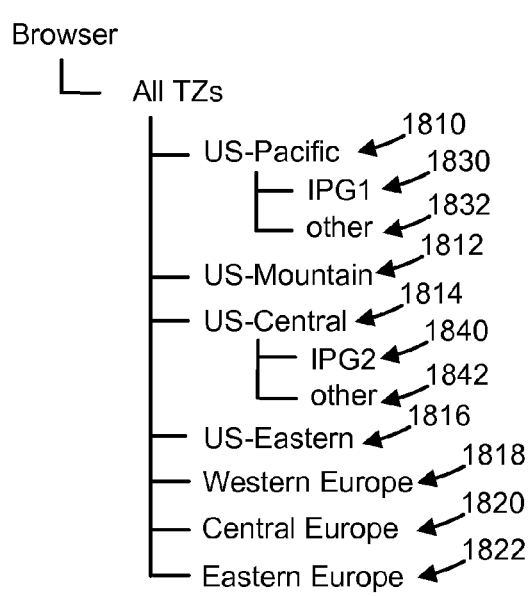
FIG. 18d depicts an example user interface display in which selectable nodes of a tree include selectable child nodes for network address groups within a time zone, and the selectable child nodes are labeled using network address groups descriptors.

FIG. 18*d* depicts an example user interface display in which selectable nodes of a tree include selectable child nodes for network address groups within a time zone, and the selectable child nodes are labeled using network address groups descriptors. The tree can identify network groups such as IPG1 and IPG2, discussed previously. FIG. 18*d* is analogous to FIG. 18*b* but includes additional child nodes for the network groups and for ungrouped metrics. For example, nodes 1830 and 1832 are child nodes of node 1810, and nodes 1840 and 1842 are child nodes of node 1814. Node 1830 can be selected by the user to view metrics for IPG1, while node 1832 can be selected to view metrics for other clients in the "US-Pacific" time zone which are not included in IPG1. Moreover, node 1810 can be selected to view metrics aggregated over all clients in the "US-Pacific" time zone. Similarly, node 1840 can be selected by the user to view metrics for IPG2, node 1842 can be selected to view metrics for other clients in the "US-Central" time zone which are not included in IPG2, and node 1814 can be selected to view metrics aggregated over all clients in the "US-Central" time zone. The tree can be populated automatically based on the time offset data, network address data, a mapping from network address data to network address group, and a mapping from time zone offset data to geographic descriptor.

Figure 18E:
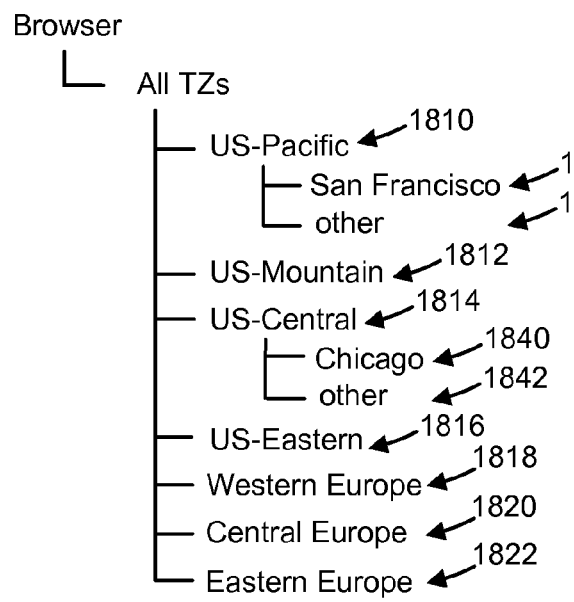
FIG. 18e depicts an example user interface display in which selectable nodes of a tree include selectable child nodes for network address groups within a time zone, and the selectable child nodes are labeled using geographic descriptors.

FIG. 18*e* depicts an example user interface display in which selectable nodes of a tree include selectable child nodes for network address groups within a time zone, and the selectable child nodes are labeled using geographic descriptors. FIG. 18*e* is analogous to FIG. 18*d* but includes geographic descriptors for nodes 1830 and 1840, which represent the network address groups IPG1 and IPG2, respectively. This can be achieved by the administrator providing a database which maps network address group to a geographic descriptor, e.g., the city, state or other location in which the clients are known to be associated with a range or other set of IP addresses. For example, the nodes 1830 and 1840 are labeled with the geographic descriptors "San Francisco" and "Chicago," respectively. The tree can thus be populated automatically based on the time offset data, network address data, a mapping from network address data to network address group, a mapping from time zone offset data to geographic descriptor and a mapping from network address group to geographic descriptor.

Figure 18F:
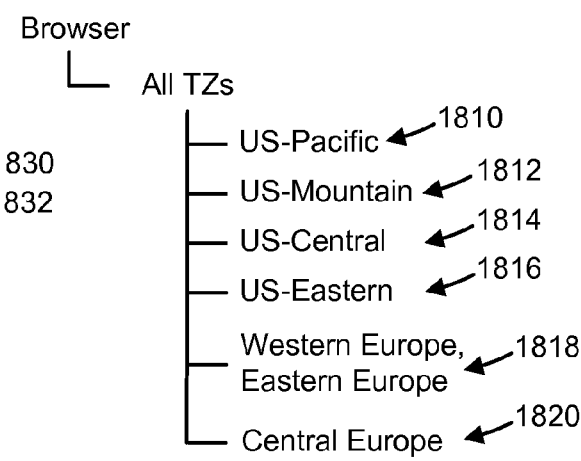
FIG. 18f depicts an example user interface display in which multiple time zones with low client counts are collapsed to a common node.

FIG. 18f depicts an example user interface display in which multiple time zones with low client counts are collapsed to a common node. FIG. 18f is analogous to FIG. 18b but the node 1818 consolidates metrics from Eastern Europe with those from Western Europe. Thus, the user may select the node 1818 to view metrics which are aggregated over multiple time zones. This may be desirable, for instance, when there is a relatively low client count, e.g., below a threshold, in some time zones. The manager can determine the client count and automatically group time zones with low client counts, as discussed previously. In one approach, limitations can be placed on the number of time zones which can be consolidated, and/or the distance between the time zones. For example, a condition may be set so that only adjacent time zones, or times zones that are separated by no more than one other time zone, are consolidated. The user interface may further provide an option to ungroup the metrics so that they are aggregated over respective single time zones which were previously consolidated.

Figure 19:
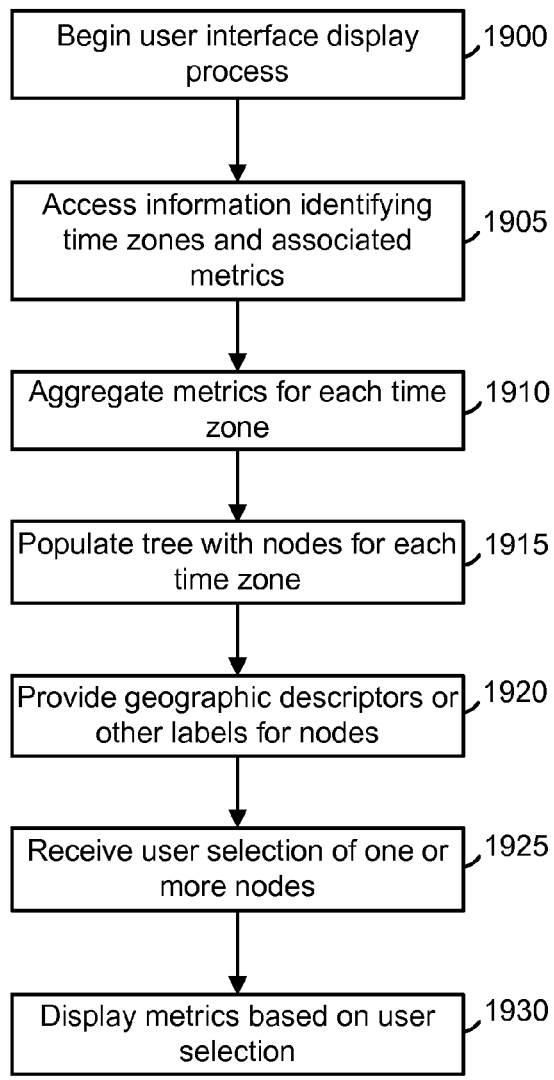
FIG. 19 depicts an example process for providing a user interface display, where metrics are aggregated over each time zone.

FIG. 19 depicts an example process for providing a user interface display, where metrics are aggregated over each time zone. At step 1900, the user interface display process begins. At step 1905, information identifying time zones and associated metrics is accessed. At step 1910, metrics for each time zone are aggregated. At step 1915, a tree is populated with nodes for each time zone, in one possible user interface format. At step 1920, geographic descriptors or other labels are provided for the nodes. At step 1925, a user selection of one or more nodes is received and, at step 1930, metrics are display based in the user selection.

Figure 20:
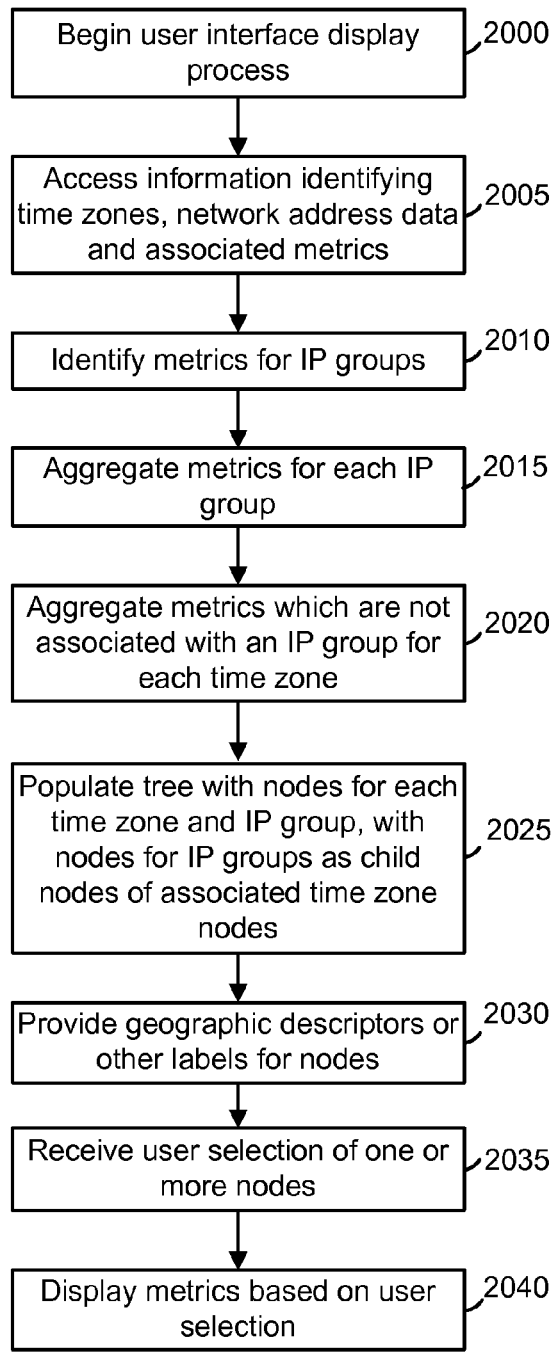
FIG. 20 depicts an example process for providing a user interface display, where metrics are aggregated over network address groups and time zones.

FIG. 20 depicts an example process for providing a user interface display, where metrics are aggregated over network address groups and time zones. At step 2000, the user interface display process begins. At step 2005, information identifying time zones, network address data and associated metrics is accessed. At step 2010, metrics for one or more network address groups such as IP groups are identified. At step 2015, the metrics for each IP group are aggregated. At step 2020, metrics which are not associated with an IP group are aggregated for each time zone. At step 2025, a tree is populated nodes for each time zone and IP group, in one possible user interface format. Further, the nodes for the IP groups are child nodes of the associated time zone nodes. At step 2030, geographic descriptors or other labels are provided for the nodes. At step 2035, a user selection of one or more nodes is received and, at step 2040, metrics are display based in the user selection.

Figure 21:
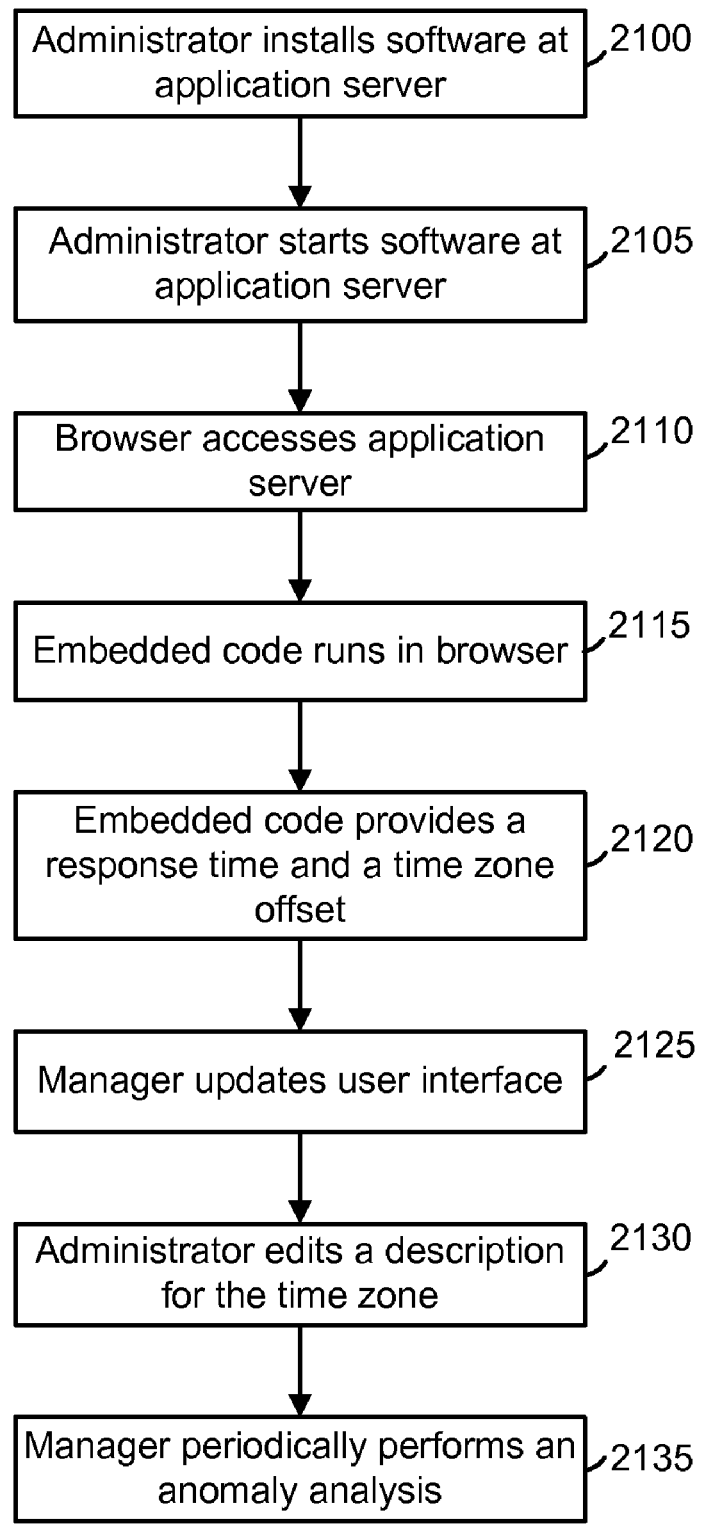
FIG. 21 provides a sample use case.

FIG. 21 provides a sample use case. At step 2100, an administrator installs software at the application server. Software has already been installed at the manager. During installation, the manager automatically creates time zone-based groups for worldwide time zones based on a listing of such time zones. The time zone-based groups initially have a property of Visible=False, so that they do not initially appear in the user interface. At step 2105, the administrator starts the software at the application server. At step 2110, a first browser accesses the application server to provide a request and obtain a corresponding response with embedded code, as discussed previously. An automated program can also provide requests and receive responses. At step 2115, the embedded code runs in the browser. At step 2120, the embedded code provides a response time and a time zone offset of +8, for instance, to the application server, and the application server provides the information to the manager. At step 2125, the manager updates the user interface so that it shows a time zone-based group labeled "UTC+8", by setting Visible=True for that group. At step 2130, the administrator reads a description for the group "UTC+8" and sees it contains the following text: "China, Hong Kong, Singapore, Taiwan, Malaysia, Philippines, Indonesia, West Australia, Macau, Mongolia, Eastern Russia." The administrator knows that the corporation has offices only in Singapore and Hong Kong in the area, so using a type view, the administrator edits the description to read: "Singapore and Hong Kong." Steps 2110-2130 repeat as response times and time zone offset data from additional browsers, as well as the first browser, is received by the manager. At step 2135, the manager periodically performs an anomaly analysis to find time zone-based groups with abnormally long response times.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for grouping metrics, comprising:

receiving, at a server, respective requests for respective web pages from a plurality of respective web browsers, each respective web browser providing a respective request for a respective web page, the server runs an application with which the respective web browsers interact;

responsive to each respective request, the server obtains the respective web page, embeds code in the respective web page by adding at least one statement to the respective web page, and provides a response to the respective web browser which includes the respective web page with the embedded code, the code is in a file which is executed by the respective web browser when the respective web page is loaded by the respective web browser, causing the respective web browser to provide, to the server, information identifying a respective time zone in which the respective web browser is located, the respective web browsers are located in different time zones;

obtaining performance metrics associated with the application by monitoring a performance of the application as the respective web browsers interact with the application; and providing the metrics and the information identifying the respective time zones to a manager, in response to which the manager provides a report in which the metrics are grouped according to time zone, and the metrics are aggregated for at least one of the respective time zones for multiple respective web browsers of the plurality of respective web browsers which have provided information to the server identifying a common time zone.

2. The computer-implemented method of claim 1, wherein: the monitoring comprises monitoring instrumented components of the application which are invoked as each respective web browser interacts with the application.

3. The computer-implemented method of claim 1, wherein: the at least one statement is tacked on at an end of the respective web pages.

4. The computer-implemented method of claim 1, wherein:
the metrics identify response times, the response times represent time differences between when the server receives the requests and when the server responds to the requests.

5. The computer-implemented method of claim 1, further comprising:
providing Internet Protocol addresses associated with the respective web browsers to the manager; and
grouping Internet Protocol addresses of the provided Internet Protocol addresses which are in a range of allocated Internet Protocol addresses for an office location, the range is known to the manager, the metrics are grouped in the report according to the grouped Internet Protocol addresses and the information identifying the respective time zones.

6. The computer-implemented method of claim 1, wherein:
the report the metrics are grouped according to the respective time zones, and the metrics are aggregated for multiple respective web browsers of the plurality of respective web browsers for at least one of the respective time zones.

7. The computer-implemented method of claim 6, wherein:
the metrics which are aggregated identify response times, the response times represent time differences between when the server receives respective requests from the respective web browsers and when the server responds to the respective requests, and the aggregated metrics include an average response time for the multiple respective web browsers.

8. The computer-implemented method of claim 6, wherein:
the report presents the metrics aggregated over a group, the group comprises at least two of the respective time zones and the metrics aggregated over the group include an average response time for respective web browsers in the at least two of the respective time zones.

9. The computer-implemented method of claim 6, further comprising:
determining a count of respective web browsers for each time zone of the plurality of respective time zones; and
if the count is below a threshold for a given time zone of the plurality of respective time zones, automatically grouping metrics associated with the given time zone with metrics of at least one other time zone of the plurality of respective time zones.

10. The computer-implemented method of claim 6, further comprising:
using the information identifying the respective time zones, accessing data which associates geographic descriptors with different time zones; and
responsive to the accessing, providing geographic descriptors for the respective time zones in the report.

11. The computer-implemented method of claim 6, wherein:
the report indicates one or more of the respective time zones for which the aggregated metrics are anomalous.

12. The computer-implemented method of claim 6, wherein:
the report separately presents: (a) aggregated metrics for at least a first group of the respective web browsers which are in one of the respective time zones and which have been associated by virtue of their network addresses, and (b) aggregated metrics for other ones of the respective web browsers which are in the one of the respective time zones and which have not been associated by virtue of their network addresses.

13. The computer-implemented method of claim 6, further comprising:
determining whether network addresses associated with the respective web browsers are available at the manager, and in response: (a) for respective web browsers hose network addresses are available at the manager, presenting metrics in the report according to the network addresses and the respective time zones, and (b) for respective web browsers whose network addresses are unavailable at the manager, presenting metrics in the report according to the respective time zones, separate from the metrics for the respective web browsers whose network addresses are available.

14. The computer-implemented method of claim 1, wherein:
the report is provided as a user interface display in which the metrics are grouped according to the respective time zones, the user interface display provides selectable elements for the respective time zones in response to the information identifying the respective time zones, each selectable element is selectable by a user to view the metrics associated with web browsers the respective time zone associated with the selected element.

15. The computer-implemented method of claim 14, further comprising:
accessing network address data associated with the web browsers;
determining at least a first group of the web browsers, which are associated by virtue of their network address data and which are identified by the manager as being located in a common time zone;
providing a first selectable child element of one of the selectable elements for the at least a first group of the web browsers, the first selectable child element is selectable by the user to view metrics associated with the at least a first group of the web browsers.

16. The computer-implemented method of claim 14, wherein:
the user interface display includes a first selectable element which is selectable by the user to view metrics which are aggregated over a group, the group comprises at least two of the respective time zones, and a second selectable element which is selectable by the user to view metrics which are aggregated over another group, the another group comprises at least one other of the respective time zones.

17. The computer-implemented method of claim 14, wherein:
the selectable elements are automatically labeled with geographic descriptors which are associated with the respective time zones in response to the information identifying the respective time zones.

18. At least one processor readable storage device having processor readable code embodied thereon for programming at least one processor to perform the computer-implemented method of claim 1.

19. The computer-implemented method of claim 1, wherein:
the code comprises JavaScript.

20. The computer-implemented method of claim 3, wherein:
the at least one statement includes a statement to include the file with the respective web page and a statement to run the file.

21. The computer-implemented method of claim 15, wherein:

web browsers in the at least a first group of the web browsers are associated by virtue of their network address data when their network address data is within a range of allocated Internet Protocol addresses for an office location, the range is known to the manager.

22. The computer-implemented method of claim 15, further comprising:
   determining at least a second group of the web browsers which are identified by the manager as being located in the common time zone, but which are not associated by virtue of their network address data; and
   providing a second selectable child element of the one of the selectable elements for the at least a second group of the web browsers the second selectable child element is selectable by the user to view metrics associated with the at least a second group of the web browsers separately from the metrics associated with the at least a first group of the web browsers.

23. The computer-implemented method of claim 22, wherein:
   web browsers in the at least a first group of the web browsers are associated by virtue of their network address data when their network address data is within a certain range of allocated Internet Protocol addresses for an office location; and
   web browsers in the at least a second group of the web browsers are not associated by virtue of their network address data when their network address data is not within the certain range of allocated Internet Protocol addresses for the office location.

* * * * *

UNITED STATES PATENT AND TRADEMARK OFFICE
CERTIFICATE OF CORRECTION

PATENT NO. : 7,730,193 B2  Page 1 of 1
APPLICATION NO. : 11/696053
DATED : June 1, 2010
INVENTOR(S) : Sargent It is certified that error appears in the above-identified patent and that said Letters Patent is hereby corrected as shown below:

IN THE CLAIMS:

Col. 17, line 18, claim 6: before "the report", insert --in--.

Col. 18, line 6, claim 13: after "browsers" and before "network", delete "hose" and replace with --whose--.

Col. 18, line 22, claim 14: after "browsers" and before "the", insert --in--.

Signed and Sealed this

Seventh Day of September, 2010

David J. Kappos
*Director of the United States Patent and Trademark Office*